(12) United States Patent
Fukumoto

(10) Patent No.: US 12,021,573 B2
(45) Date of Patent: Jun. 25, 2024

(54) DISPLAY DEVICE

(71) Applicant: SMC CORPORATION, Tokyo (JP)

(72) Inventor: Shinya Fukumoto, Yashio (JP)

(73) Assignee: SMC CORPORATION, Tokyo (JP)

( * ) Notice: Subject to any disclaimer, the term of this patent is extended or adjusted under 35 U.S.C. 154(b) by 51 days.

(21) Appl. No.: 17/654,155

(22) Filed: Mar. 9, 2022

(65) Prior Publication Data

US 2022/0294544 A1    Sep. 15, 2022

(30) Foreign Application Priority Data

Mar. 11, 2021   (JP) .................................. 2021-039037

(51) Int. Cl.
*H04B 17/30*   (2015.01)
*G06F 3/14*   (2006.01)

(52) U.S. Cl.
CPC .............. *H04B 17/30* (2015.01); *G06F 3/14* (2013.01)

(58) Field of Classification Search
CPC ....................................................... H04B 17/30
See application file for complete search history.

(56) References Cited

U.S. PATENT DOCUMENTS

2004/0235485 A1\* 11/2004 Tanaka .................. H04W 16/10
                                                          455/447
2010/0194985 A1\* 8/2010 Unger ...................... H04N 5/50
                                                          455/66.1

FOREIGN PATENT DOCUMENTS

JP        11-261557 A      9/1999
WO    WO 2011/014109 A1    2/2011

OTHER PUBLICATIONS

Extended European Search Report dated Jul. 15, 2022, in corresponding European Patent Application No. 22160694.0, 8 pages.

\* cited by examiner

*Primary Examiner* — Natasha W Cosme
(74) *Attorney, Agent, or Firm* — Oblon, McClelland, Maier & Neustadt, L.L.P.

(57) ABSTRACT

A display device includes a storage unit that stores, in association with each other, a plurality of channels or a plurality of center frequencies assigned to a predetermined frequency band, and occupied frequency bands that are set to the plurality of channels or the plurality of center frequencies, an operation unit which enables a user to input the channels or the center frequencies, and a control unit that determines, based on information contained in the storage unit, the occupied frequency bands corresponding to the channels or the center frequencies input by the operation unit, determines, as recommended frequencies, frequencies included within the frequency band and not included within the determined occupied frequency bands, and causes a display unit to display the recommended frequencies.

2 Claims, 13 Drawing Sheets

| CHANNEL | CENTER FREQUENCY [MHz] | OCCUPIED FREQUENCY BAND [MHz] |
|---|---|---|
| 1ch | 2412 | 2401-2423 |
| 2ch | 2417 | 2406-2428 |
| 3ch | 2422 | 2411-2433 |
| 4ch | 2427 | 2416-2438 |
| 5ch | 2432 | 2421-2443 |
| 6ch | 2437 | 2426-2448 |
| 7ch | 2442 | 2431-2453 |
| 8ch | 2447 | 2436-2458 |
| 9ch | 2452 | 2441-2463 |
| 10ch | 2457 | 2446-2468 |
| 11ch | 2462 | 2451-2473 |
| 12ch | 2467 | 2456-2478 |
| 13ch | 2472 | 2461-2483 |
| 14ch | 2484 | 2473-2495 |

DISPLAY DEVICE

CROSS-REFERENCE TO RELATED APPLICATIONS

This application is based upon and claims the benefit of priority from Japanese Patent Application No. 2021-039037 filed on Mar. 11, 2021, the contents of which are incorporated herein by reference.

BACKGROUND OF THE INVENTION

Field of the Invention

The present invention relates to a display device that displays frequencies in a predetermined frequency band.

Description of the Related Art

In JP H11-261557 A, a network for FA (frequency analysis) is disclosed. Such an FA network is provided in industrial equipment in which robots and the like are used. Such an FA network includes a master and a plurality of slaves. The master and the plurality of slaves transmit and receive data to and from each other in a wireless manner.

SUMMARY OF THE INVENTION

A 2.4 GHz frequency band (ISM band) is generally open to the public. The number of wireless devices that perform data communication using the 2.4 GHz frequency band is increasing. Therefore, the possibility that interference between radio waves will occur in the 2.4 GHz frequency band is becoming higher.

In the case that a user who manages industrial equipment newly installs a wireless device in the industrial equipment, it is necessary to set the frequencies used by the wireless device while avoiding frequencies that are already being used. Accordingly, in the case that a plurality of channels are used, it is necessary for the user to investigate which frequencies are not being used. The frequencies that are not being used are also referred to as free frequencies. Such an operation is troublesome for the user to perform.

The present invention has the object of solving the aforementioned problem.

One aspect of the present invention is characterized by a display device that displays, on a display unit, recommended frequencies recommended for use in a wireless device configured to carry out transmission and reception of data by switching between hopping frequencies in a predetermined frequency band, the display device comprising a storage unit configured to store, in association with each other, a plurality of channels or a plurality of center frequencies assigned to the frequency band, and occupied frequency bands that are set to the plurality of channels or the plurality of center frequencies, an operation unit configured to enable a user to input the channels or the center frequencies, and a control unit configured to determine, based on information contained in the storage unit, the occupied frequency bands corresponding to the channels or the center frequencies input by the operation unit, to determine, as the recommended frequencies, frequencies included within the frequency band and not included within the determined occupied frequency bands, and to cause the display unit to display the recommended frequencies.

According to the present invention, the user is capable of easily being made aware of free frequencies existing within a predetermined frequency band.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is a diagram showing an example of first frequency information;

DESCRIPTION OF THE INVENTION

1. First Embodiment

[1.1. Industrial Wireless Communication System 10]

Figure 1:
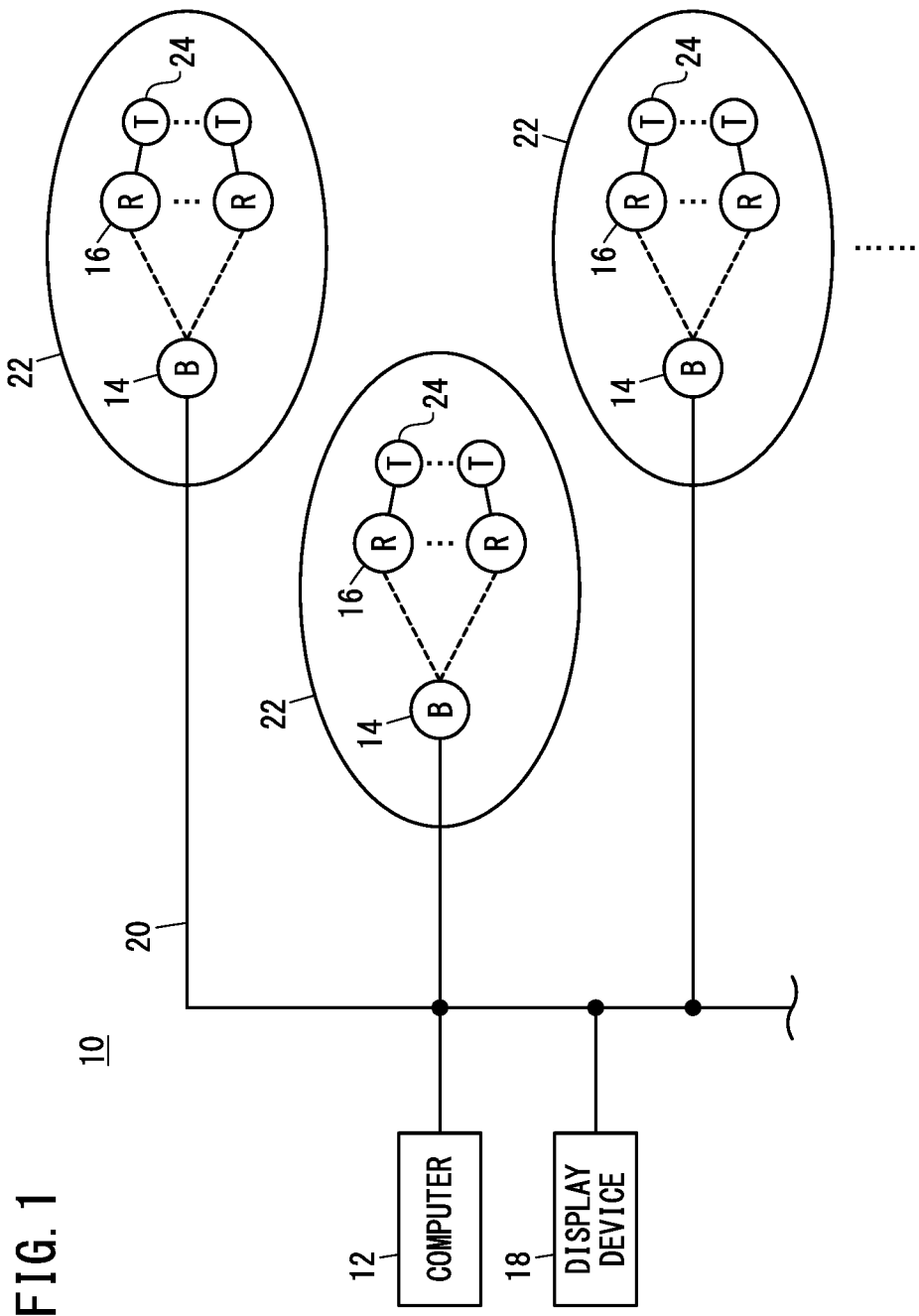
FIG. 1 is a diagram showing the configuration of an industrial wireless communication system in which a display device is used.

FIG. 1 is a diagram showing the configuration of an industrial wireless communication system 10 in which a display device 18 is used. In the industrial wireless communication system 10, there are provided a single computer 12, a plurality of base wireless devices 14, a plurality of remote wireless devices 16, and the display device 18. The industrial wireless communication system 10 is equipped with a plurality of networks 22. A single base wireless device 14 and a plurality of remote wireless devices 16 are provided in one of the networks 22. The single computer 12, the plurality of base wireless devices 14, and the display device 18 are connected over wires or wirelessly in order to enable communication therebetween. The wired connection may be a fieldbus 20. The wireless connection may be by way of short-range wireless communication. The plurality of remote wireless devices 16 are synchronously connected to the single base wireless device 14.

The computer 12 is capable of monitoring and controlling the industrial equipment. Although not limited to this feature, the computer 12 is constituted, for example, by a PLC (programmable logic controller). The computer 12 is capable of carrying out communication with other devices using an input/output interface (not shown).

The base wireless devices 14 are also referred to as master wireless devices. The base wireless devices 14 are capable of carrying out communication with the computer 12 and the display device 18 using an input/output interface (not shown) or a first communication unit (not shown). The base wireless devices 14 are capable of carrying out communication with the remote wireless devices 16 using a second communication unit (not shown) that carries out wireless communication in a frequency band of 2.4 GHz.

The remote wireless devices 16 are also referred to as slave wireless devices. The remote wireless devices 16 are each provided in each of a plurality of machinery 24 (see FIG. 1) that make up the industrial equipment. As such machinery 24, although not limited thereto, there may be cited sensors, valves, and the like. The remote wireless devices 16 are each equipped with a communication unit (not shown) that carries out wireless communication in a frequency band of 2.4 GHz. By using such a communication unit, the remote wireless devices 16 are capable of communicating with the base wireless devices 14. In the example shown in FIG. 1, one piece of the machinery 24 is provided for each one of the remote wireless devices 16. However, a plurality of the machinery 24 may be provided for each one of the remote wireless devices 16.

The base wireless devices 14 and the remote wireless devices 16 communicate with each other by way of a frequency hopping method. More specifically, the base wireless devices 14 and the remote wireless devices 16 switch between hopping frequencies at a predetermined hopping cycle to thereby transmit and receive data.

[1.2. Display Device 18]

Figure 2:
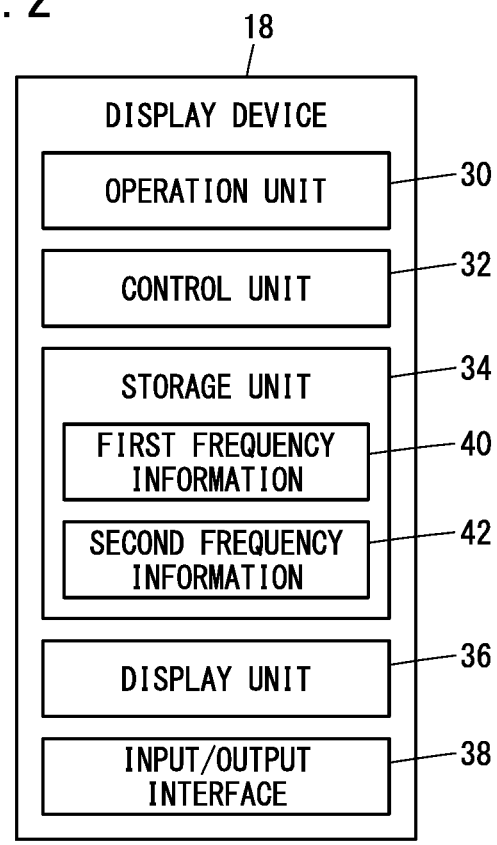
FIG. 2 is a block diagram showing a display device according to a first embodiment.

FIG. 2 is a block diagram showing the display device 18 according to the first embodiment. The display device 18, for example, includes a personal computer or a mobile terminal (a tablet type terminal, a smartphone or the like). The personal computer or the mobile terminal is capable of communicating with other devices over wires or wirelessly. FIG. 1 shows a state in which the display device 18 which includes the personal computer is connected to another device by a fieldbus 20. The display device 18 is equipped with an operation unit 30, a control unit 32, a storage unit 34, a display unit 36, and an input/output interface 38.

The operation unit 30 includes, for example, at least one of a keyboard, a mouse, a touch pad, a touch panel, and a microphone. The operation unit 30 is a human-machine interface in order for the user to input data and instructions to the display device 18. The data input by the operation unit 30 is stored in the storage unit 34.

The control unit 32 includes a processor, and more specifically, a processing circuit such as a CPU or the like. The control unit 32 administers the control of the display device 18 in its entirety. The control unit 32 realizes various functions by executing programs stored in the storage unit 34. For example, the control unit 32, based on information contained in the storage unit 34, determines the occupied frequency bands corresponding to channels or center frequencies input by the operation unit 30. Further, the control unit 32 determines non-recommended frequencies 52 (see FIG. 5, etc.) and recommended frequencies 54 (see FIG. 5, etc.), and causes the display unit 36 to display the non-recommended frequencies 52 and the recommended frequencies 54. The non-recommended frequencies 52 refer to frequencies that are being used within the 2.4 GHz frequency band. The recommended frequencies 54 refer to frequencies that are not being used within the 2.4 GHz frequency band. Moreover, at least a portion of the control unit 32 may be realized by an integrated circuit such as an ASIC, an FPGA, or the like. Further, at least a portion of the control unit 32 may include an electronic circuit containing a discrete device.

The storage unit 34 includes a volatile memory and a non-volatile memory. As the volatile memory, for example, there may be cited a RAM or the like. As the non-volatile memory, for example, there may be cited a ROM, a flash memory, or the like. The volatile memory is used as a working memory for the processor, and temporarily stores data and the like necessary for performing processes or calculations. In the non-volatile memory, there are stored, for example, programs, tables, maps, and the like. At least a portion of the storage unit 34 may be provided in the processor, the integrated circuit, or the like as described above.

The non-volatile memory of the storage unit 34 stores first frequency information 40 and second frequency information 42. The first frequency information 40 is information referred to when the user inputs channels that are already being used. More specifically, the first frequency information 40 is information in which channel numbers and occupied frequency band information are associated with each other. The channel numbers are numbers assigned to the channels assigned to the 2.4 GHz frequency band. The respective channels include occupied frequency bands of 22 MHz. The occupied frequency band information is information in relation to each of the occupied frequency bands. For example, the occupied frequency band information includes a center frequency of the occupied frequency band, an upper limit frequency of the occupied frequency band, and a lower limit frequency of the occupied frequency band. For example, in the case of a wireless LAN, the communication standard of which is specified by IEEE 802.11b, then as shown in FIG. 3, the first frequency information 40 associates the channel numbers of 1 ch to 14 ch with the occupied frequency bands of the respective channels. The same consideration applies to other wireless communication standards. Moreover, the non-volatile memory of the first embodiment stores the channels and the occupied frequency bands of the wireless LAN specified by IEEE 802.11b, as the first frequency information 40. There are cases in which the number of channels used within the 2.4 GHz frequency band are determined independently depending on the country. The first frequency information 40 is set according to the country in which the industrial wireless communication system 10 is provided. On the other hand, the second frequency information 42 is information referred to by the control unit 32 when the user inputs center frequencies that are already being used. More specifically, the second frequency information 42 is information indicating a bandwidth (for example, 1 MHz) with the input frequency as the center frequency thereof.

The display unit 36 includes a monitor such as a liquid crystal display or the like. The display unit 36 displays an image 50 (see FIG. 5, etc.) in response to a display command output from the control unit 32. For example, the display unit 36 displays the image 50 in which the non-recommended frequencies 52 and the recommended frequencies 54 are included.

The input/output interface 38 includes an interface (for example, a connector, a modem, or the like) for the purpose of realizing a fieldbus connection.

[1.3. Process of Displaying Recommended Frequencies 54 and Non-Recommended Frequencies 52]

Figure 4:
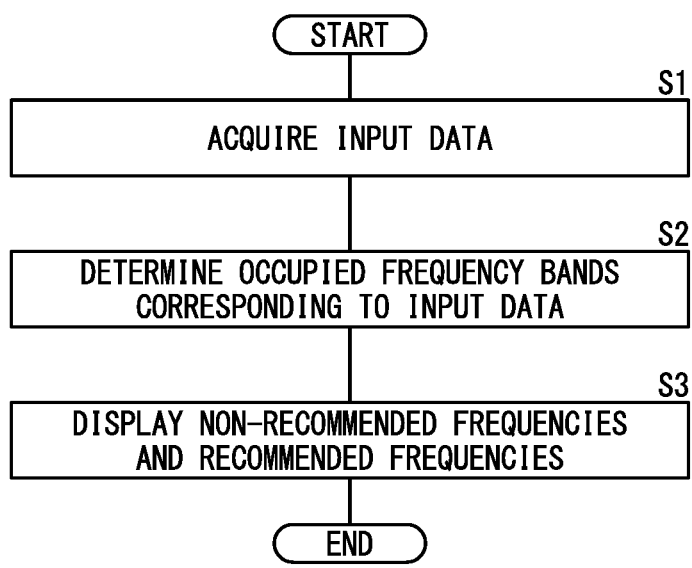
FIG. 4 is a flowchart showing a display process performed by the display device according to the first embodiment.
Figure 5:
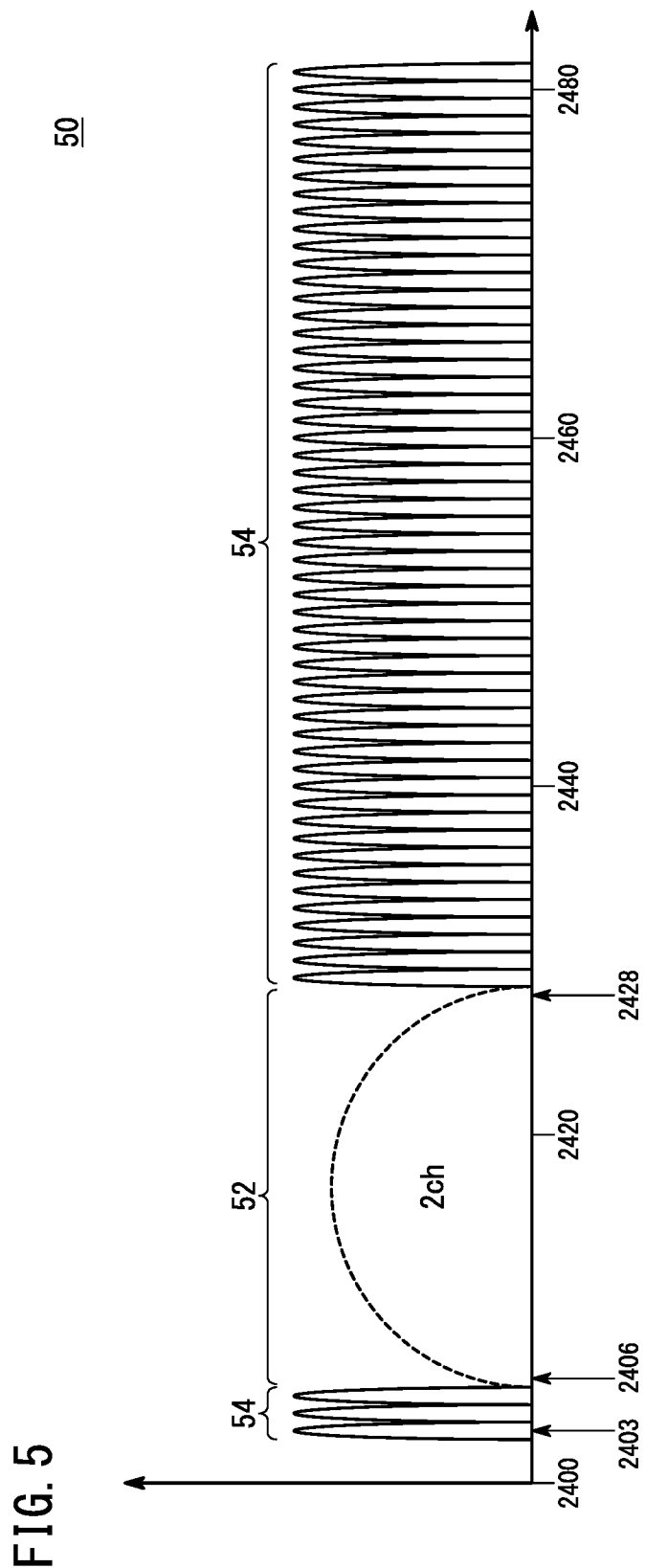
FIG. 5 is a diagram showing an example of an image displayed by the display device.
Figure 6:
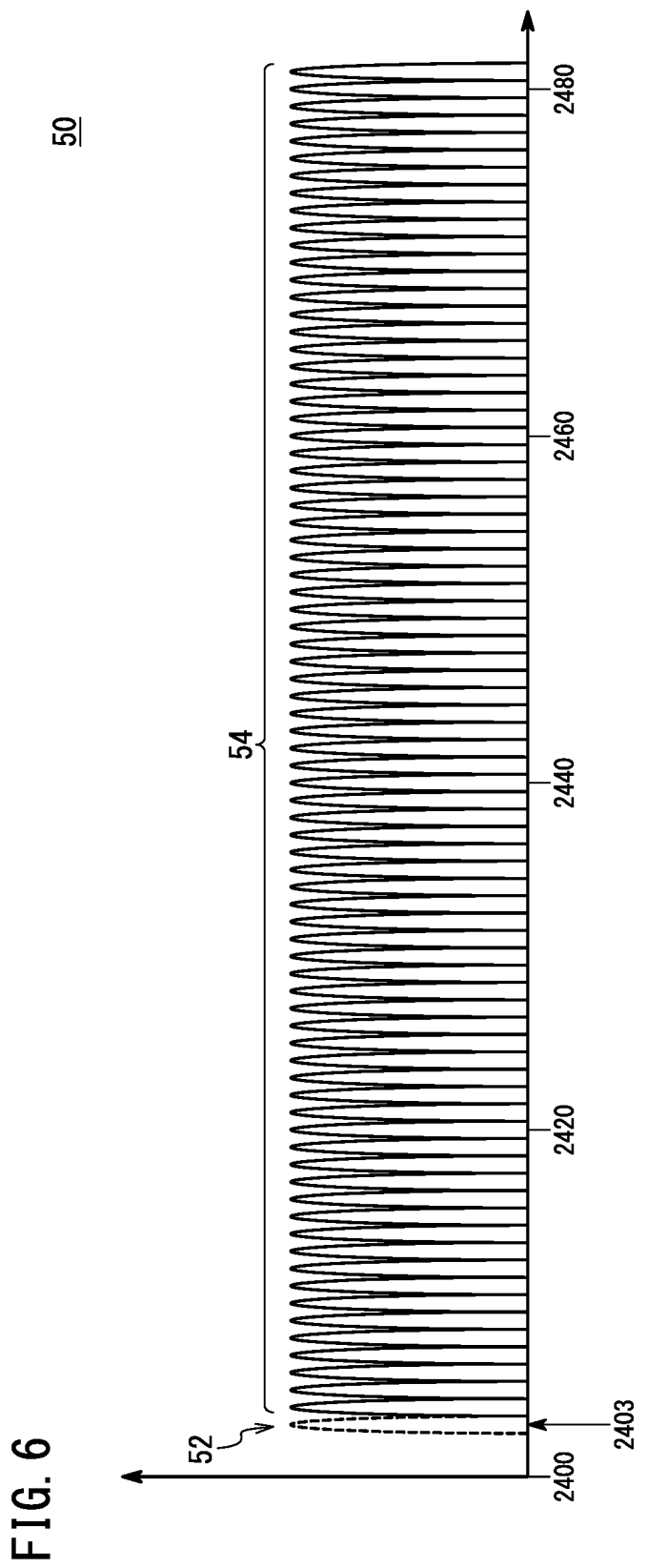
FIG. 6 is a diagram showing an example of an image displayed by the display device.

FIG. 4 is a flowchart showing a display process performed by the display device 18 according to the first embodiment. FIGS. 5 and 6 are diagrams showing examples of the image 50 displayed by the display device 18. Prior to installing a new wireless device in the industrial equipment, the user investigates, with a frequency measuring device or the like, the channels that are already being used in the industrial equipment. The user also investigates, with the frequency measuring device or the like, the frequencies that are already being used in the industrial equipment. Thereafter, the user operates the operation unit 30 and thereby inputs, to the display device 18, at least one of the channel numbers of the channels already being used, or the frequencies already being used. At this time, the user can input a plurality of the channel numbers and a plurality of the frequencies. When the user performs a predetermined operation on the operation unit 30, the display device 18 initiates the following display process.

In step S1, the control unit 32 acquires input data from the storage unit 34. When step S1 is completed, the process proceeds to step S2.

In step S2, the control unit 32 determines the occupied frequency bands corresponding to the input data. In the case that the channel numbers are input, the control unit 32 determines the occupied frequency bands corresponding to the channel numbers, with reference to the first frequency information 40. Further, in the case that the frequencies are input, the control unit 32 determines the occupied frequency bands of 1 MHz with the input frequencies as the center frequencies thereof, with reference to the second frequency information 42. When step S2 is completed, the process proceeds to step S3.

In step S3, the control unit 32 determines, as being the non-recommended frequencies 52, the occupied frequency bands determined in step S2. The control unit 32 determines, as being the recommended frequencies 54, frequencies other than the non-recommended frequencies 52 included within the 2.4 GHz frequency band. Then, the control unit 32 causes the non-recommended frequencies 52 and the recommended frequencies 54 to be displayed on the display unit 36 so as to be distinguishable from each other. The display unit 36 displays the image 50 in response to a display command output from the control unit 32. An example of the image 50 is shown in FIG. 5 or FIG. 6. A graph is shown in the image 50. In such a graph, respective frequencies from 2403 MHz to 2481 MHz are arranged in the horizontal direction, and the non-recommended frequencies 52 and the recommended frequencies 54 are shown separately in a vertical direction.

For example, in the case that the user selects 2 ch by operating the operation unit 30, the display unit 36 displays the image 50 shown in FIG. 5. The display unit 36 displays the 2 ch occupied frequency band as the non-recommended frequencies 52. The display unit 36 displays the frequencies other than the non-recommended frequencies 52 as the recommended frequencies 54. The non-recommended frequencies 52 are frequencies included within the 2 ch occupied frequency band. The minimum frequency of the 2 ch occupied frequency band is 2406 MHz. The maximum frequency of the 2 ch occupied frequency band is 2428 MHz. The bandwidth of the 2 ch occupied frequency band is 22 MHz.

For example, in the case that the user selects 2403 MHz by operating the operation unit 30, the display unit 36 displays the image 50 shown in FIG. 6. The display unit 36 displays the 2403 MHz occupied frequency band as the non-recommended frequencies 52. The display unit 36 displays the frequencies other than the non-recommended frequencies 52 as the recommended frequencies 54. The non-recommended frequencies 52 are frequencies having 2403 MHz as the center frequency thereof included within a bandwidth of 1 MHz.

As shown in FIGS. 5 and 6, as one example thereof, the display unit 36 displays the non-recommended frequencies 52 as a dashed line and the recommended frequencies 54 as a solid line. However, the display unit 36 may display the non-recommended frequencies 52 and the recommended frequencies 54 in different colors. Alternatively, the display unit 36 may display each of the non-recommended frequencies 52 and the recommended frequencies 54 by numerical values.

Figure 7:
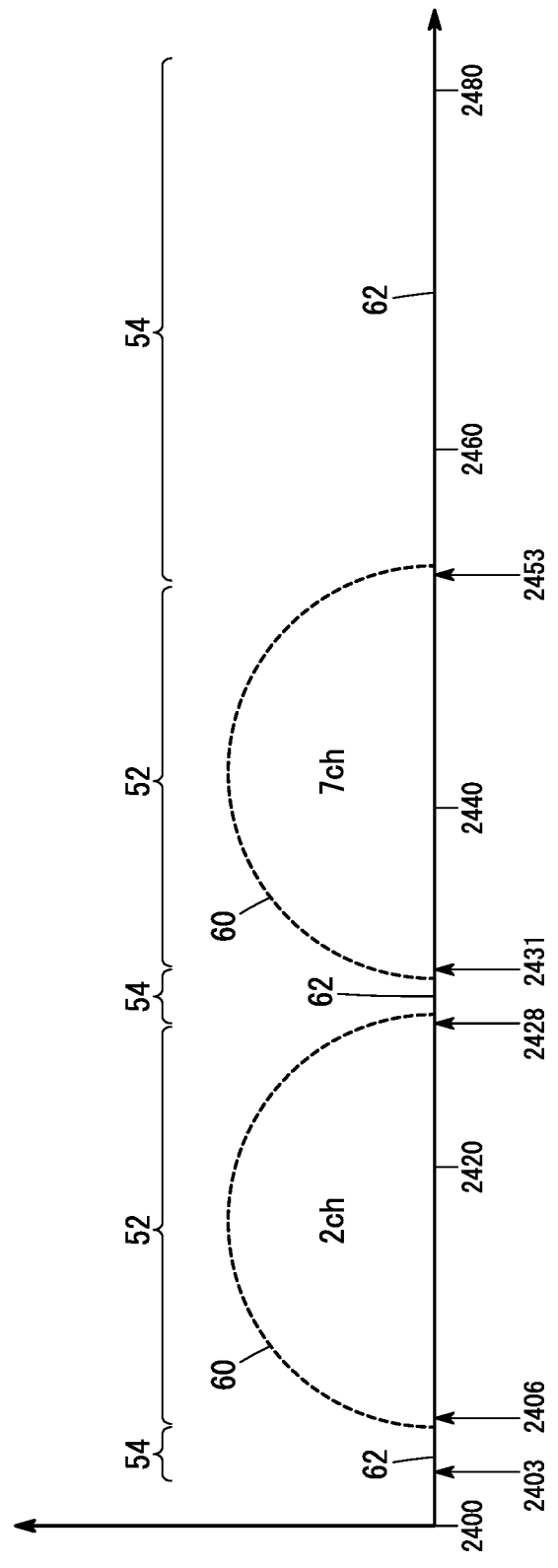
FIG. 7 is a diagram showing an example of an image displayed by the display device.
Figure 8:
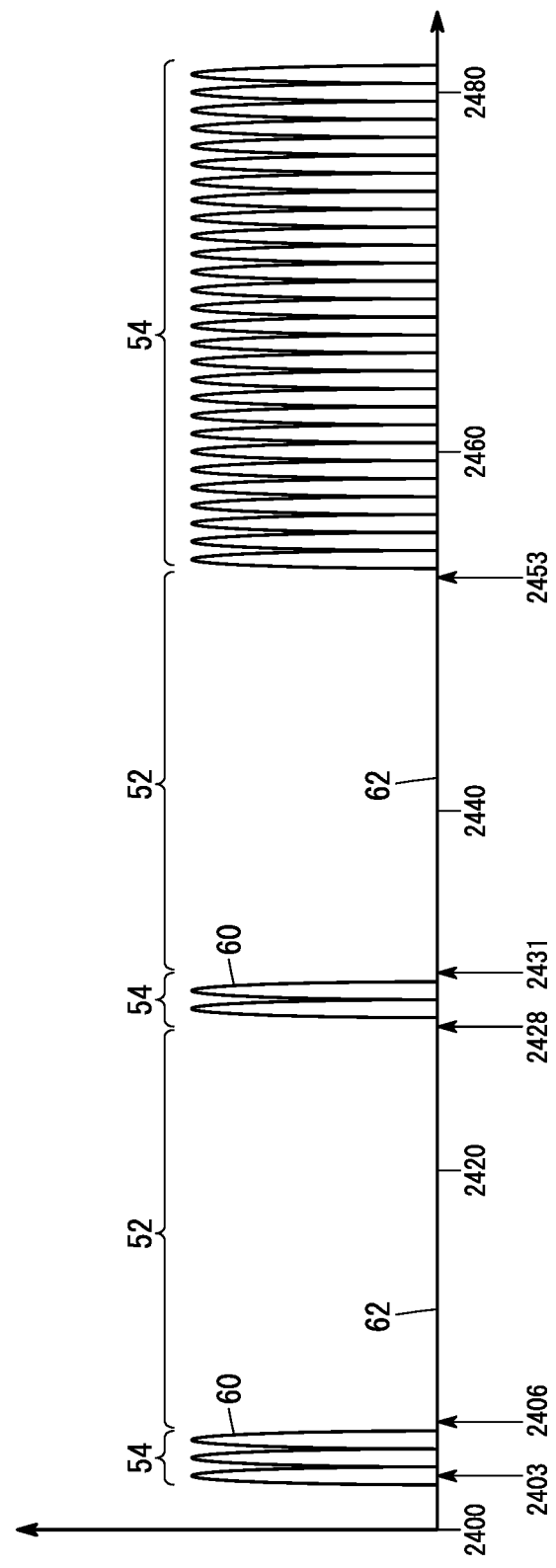
FIG. 8 is a diagram showing an example of an image displayed by the display device.

The display unit 36 may display the non-recommended frequencies 52 and the recommended frequencies 54 in different display forms. For example, as shown in FIG. 7, the display unit 36 may display the non-recommended frequencies 52 as convex portions 60 that project toward the plus side of the vertical axis. Further, the display unit 36 may display the recommended frequencies 54 as flat portions 62 that overlap with the horizontal axis. Conversely, as shown in FIG. 8, the display unit 36 may display the recommended frequencies 54 as convex portions 60 that project toward the plus side of the vertical axis. Further, the display unit 36 may display the non-recommended frequencies 52 as flat portions 62 that overlap with the horizontal axis. In this case, the display unit 36 may switch between and display the image 50 shown in FIG. 7 and the image 50 shown in FIG. 8. Switching between the images 50 may be carried out by an operation performed by the operation unit 30.

According to the first embodiment, frequencies that are not being used by the industrial equipment are displayed on the display unit 36. Therefore, the user is capable of easily being made aware of the free frequencies existing within a predetermined frequency band, for example, the frequency band of 2.4 GHz.

2. Second Embodiment

Cases may occur in which there are only a few free frequencies available in the 2.4 GHz frequency band, or in which there are no free frequencies available in the 2.4 GHz frequency band. However, in general, not all of the frequencies included within the occupied frequency bands of the channels are in use at all times. For example, in the case there is no communication data in the X ch (X refers to any one of the channels 1 to 14) in a certain time slot, the respective frequencies included within the occupied frequency band of X ch are not being used in such a time slot. In this case, even if a newly provided wireless device uses a frequency included within the occupied frequency band of X ch, interference between the radio waves does not occur. In other words, even if a newly provided wireless device uses a frequency included within the occupied frequency band of X ch, there is a possibility that interference between the radio waves may occur from time to time, but not at all times. According to the second embodiment, a degree of interference between the radio waves which is capable of being tolerated by the user is used as input data for the display device 18.

[2.1. Display Device 18]

Figure 9:
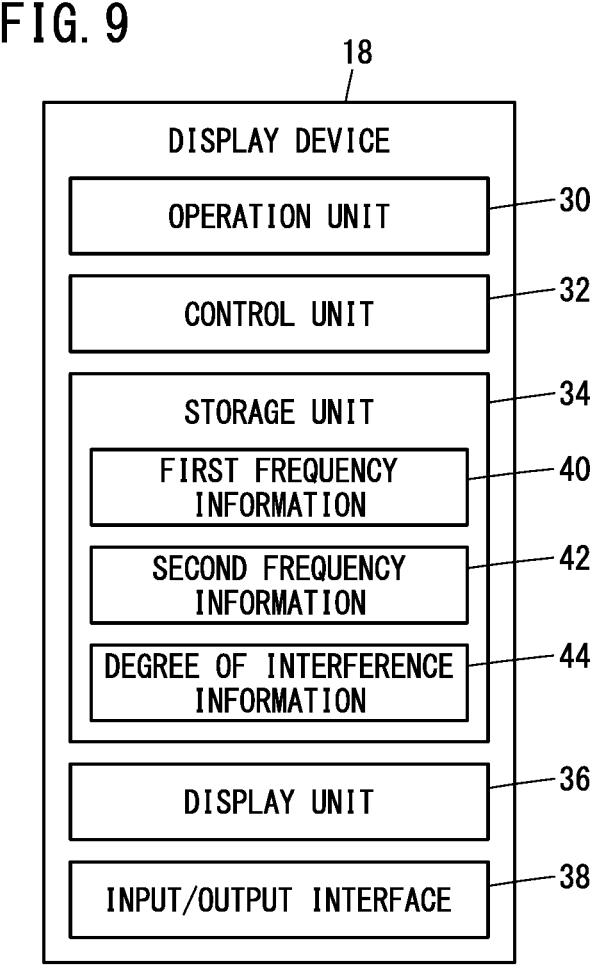
FIG. 9 is a block diagram showing a display device according to a second embodiment.

FIG. 9 is a block diagram showing the display device 18 according to the second embodiment. In the second embodiment, the same constituent elements as those in the first embodiment are designated by the same reference numerals, and description thereof will be omitted.

The non-volatile memory of the storage unit 34 stores degree of interference information 44. In the degree of interference information 44, a degree of interference, which will be described below, and an amount of band narrowing, are associated with each other.

The degree of interference is an allowable amount of the number of times that the radio waves used in a newly provided wireless device and other radio waves interfere with each other within a certain time period. The degree of interference also serves as a parameter for specifying an amount of narrowing of the frequency bands displayed as the non-recommended frequencies 52 on the display unit 36. As one example, the degree of interference is divided into a "small", a "medium", and a "large" degree of interference. The larger the degree of interference, the larger the amount of band narrowing that is associated therewith. According to the second embodiment, a "small" degree of interference is associated with an amount of band narrowing of "0 MHz". A "medium" degree of interference is associated with an amount of band narrowing of "1 MHz". A "large" degree of interference is associated with an amount of band narrowing of "2 MHz". Moreover, the amount of band narrowing is an amount that acts to shift each of a maximum frequency and a minimum frequency of the occupied frequency bands toward the center frequency side. More specifically, in the case that the degree of interference is "small", each of the channels is displayed on the display unit 36 while the bandwidth of the channel is maintained at 22 MHz. In the case that the degree of interference is "medium", each of the maximum frequency and the minimum frequency of each of the channels is shifted by 1 MHz toward the center frequency side. Therefore, each of the channels is displayed on the display unit 36 in a state in which the bandwidth of the channel is narrowed from the normal 22 MHz to 20 MHz. Further, in the case that the degree of interference is "large", each of the maximum frequency and the minimum frequency of each of the channels is shifted by 2 MHz toward the center frequency side. Therefore, each of the channels is displayed on the display unit 36 in a state in which the bandwidth of the channel is narrowed from the normal 22 MHz to 18 MHz.

[2.2. Process of Displaying Recommended Frequencies 54 and Non-Recommended Frequencies 52]

Figure 10:
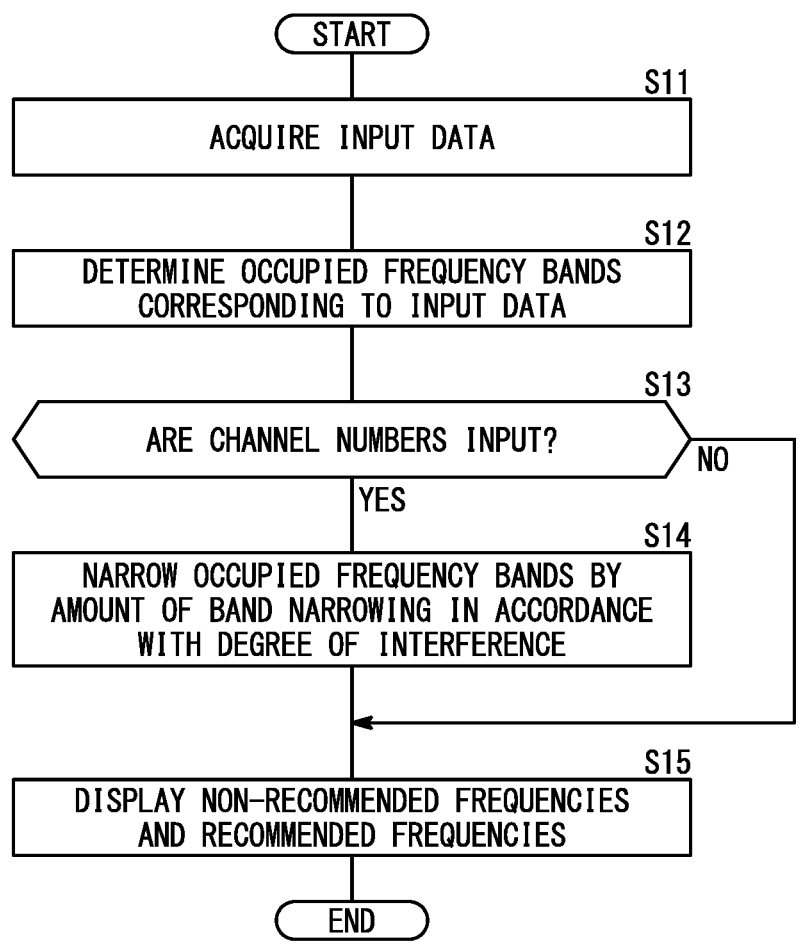
FIG. 10 is a flowchart showing a display process performed by the display device according to the second embodiment.
Figure 11:
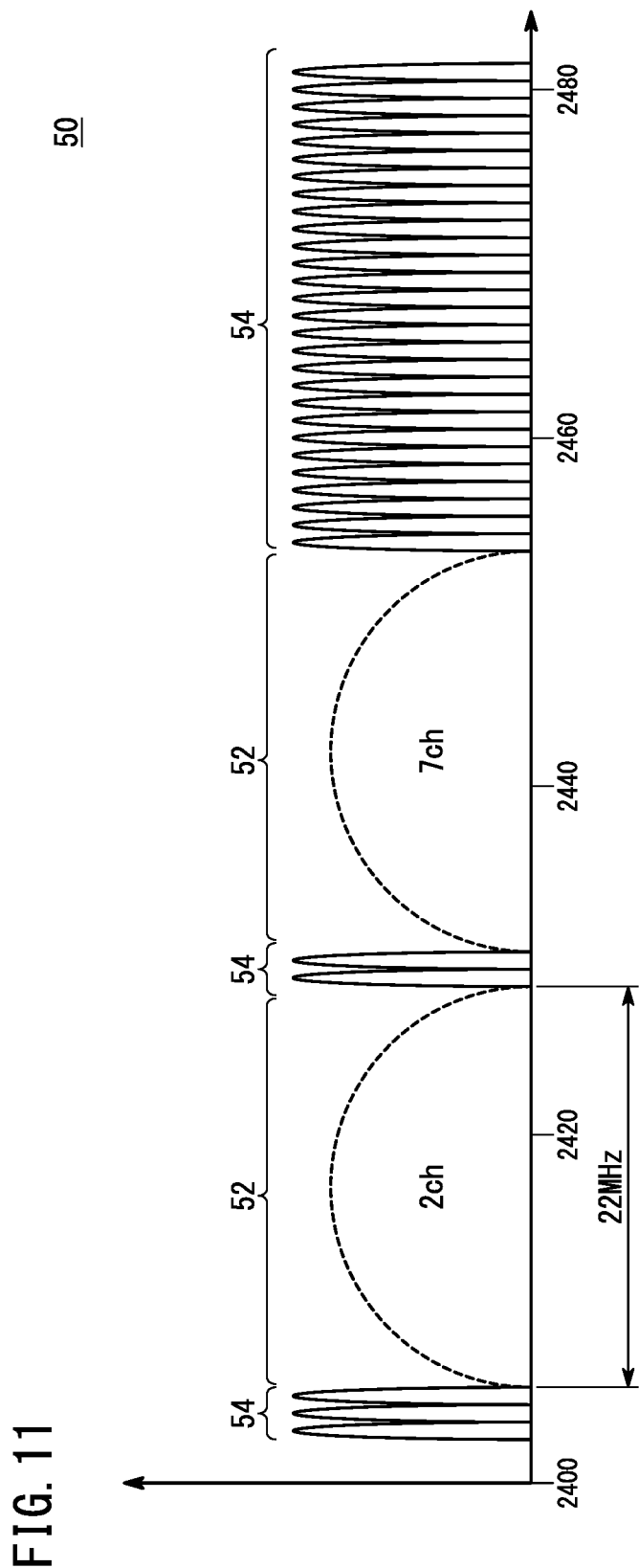
FIG. 11 is a diagram showing an example of an image displayed by the display device.
Figure 12:
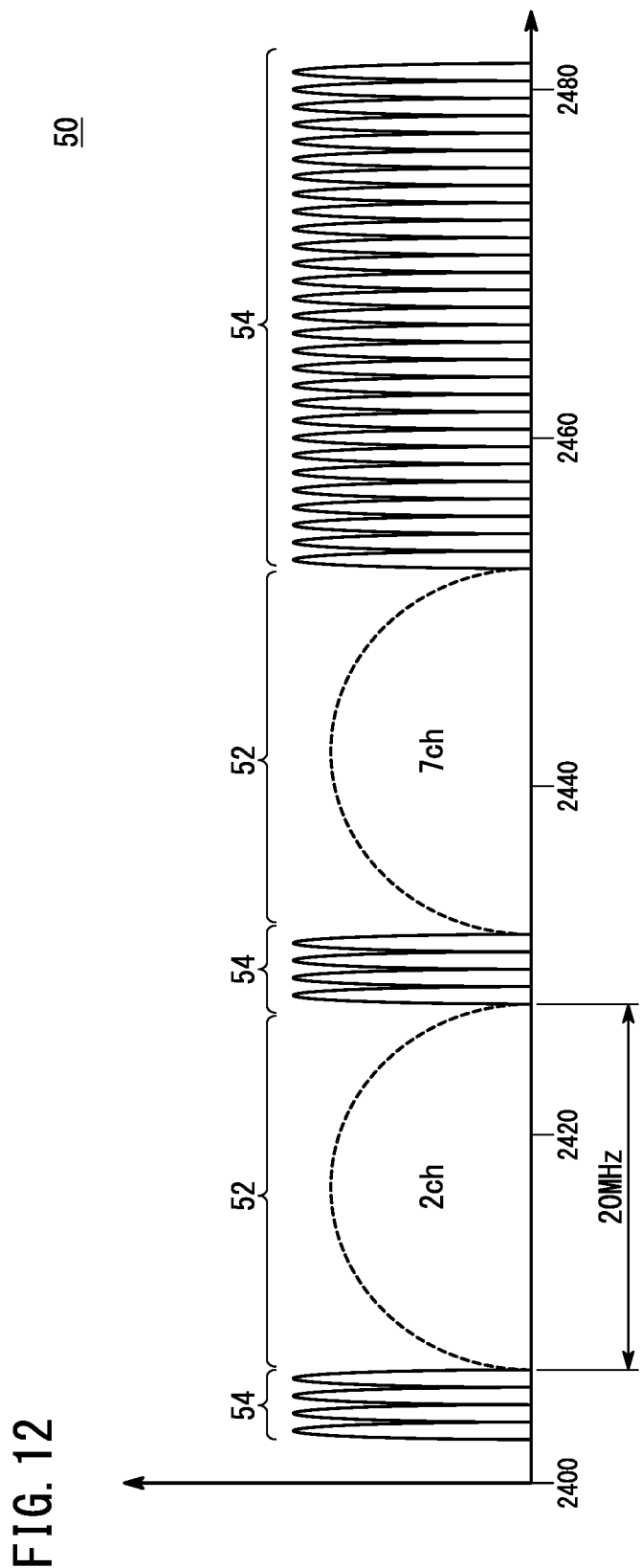
FIG. 12 is a diagram showing an example of an image displayed by the display device.
Figure 13:
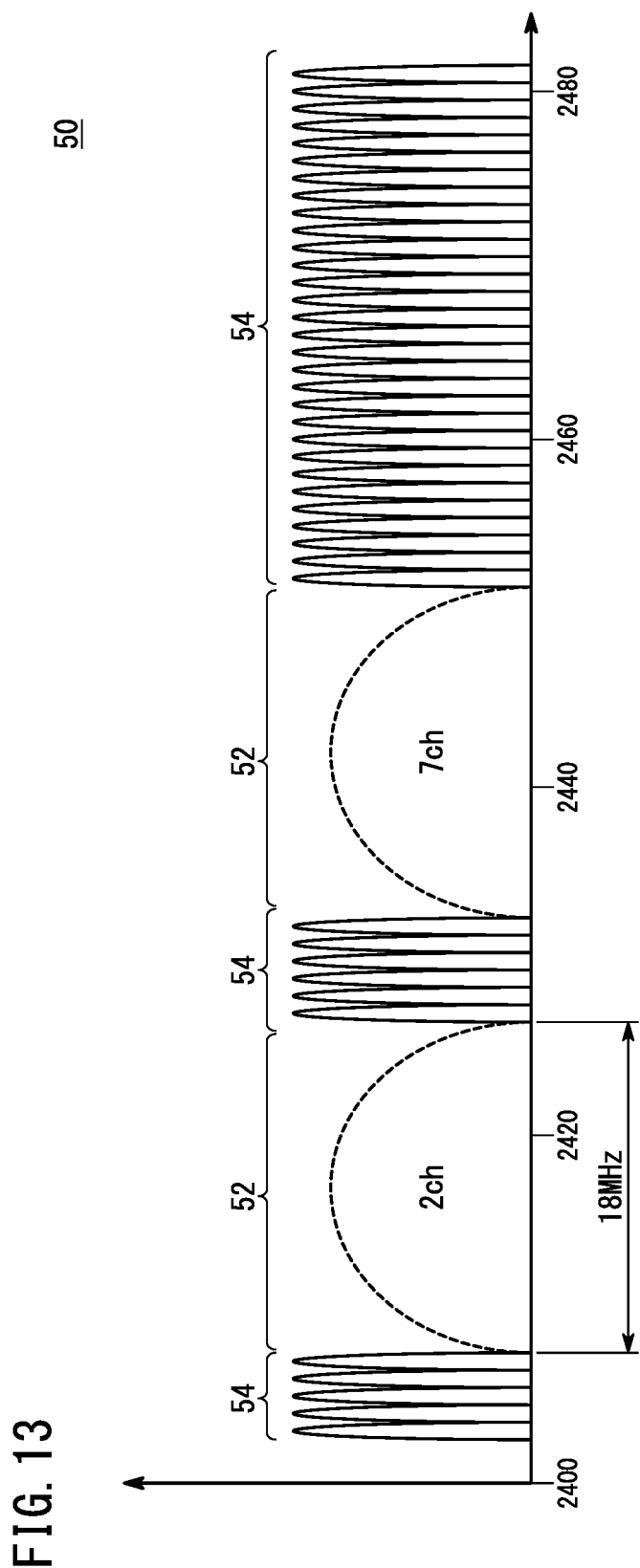
FIG. 13 is a diagram showing an example of an image displayed by the display device.

FIG. 10 is a flowchart showing a display process performed by the display device 18 according to the second embodiment. FIGS. 11 to 13 are diagrams showing examples of the image 50 displayed by the display device 18. The user operates the operation unit 30 and thereby inputs, to the display device 18, at least one of the channel numbers of the channels already being used in the industrial equipment, or the frequencies already being used in the industrial equipment. Furthermore, the user inputs any one of the degree of interference of "small", "medium", and "large". It should be noted that the default degree of interference is "small". Therefore, in the case that a "small" degree of interference is desired by the user, the operation of inputting the degree of interference can be omitted. The input data is stored in the storage unit 34. When the user performs a predetermined operation on the operation unit 30, the display device 18 initiates the following display process.

The process of step S11 and the process of step S12 are the same as the process of step S1 and the process of step S2 shown in FIG. 4. When step S12 is completed, the process proceeds to step S13.

In step S13, the control unit 32 determines whether or not the channel numbers have been input. In the case that the channel numbers are included in the input data (step S13: YES), the process proceeds to step S14. On the other hand, in the case that the frequencies are input without the channel numbers being input, the channel numbers are not included in the input data. In the case that the channel numbers are not included in the input data (step S13: NO), the process proceeds to step S15.

In step S14, the control unit 32 narrows the occupied frequency bands determined in step S12 by an amount of band narrowing in accordance with the degree of interference input by the user. In the case that a "small" degree of interference is input, the control unit 32 maintains the occupied frequency bands without change. In the case that a "medium" degree of interference is input, the control unit 32 shifts each of the maximum frequency of the occupied frequency bands and the minimum frequency of the occupied frequency bands by 1 MHz toward the center frequency side. In the case that a "large" degree of interference is input, the control unit 32 shifts each of the maximum frequency of the occupied frequency bands and the minimum frequency of the occupied frequency bands by 2 MHz toward the center frequency side. When step S14 is completed, the process proceeds to step S15.

The process of step S15 is the same as the process of step S3 shown in FIG. 4. In response to a display command output from the control unit 32, the display unit 36 displays the images 50 shown in FIGS. 11 to 13, for example.

For example, in the case that the user selects 2 ch and 7 ch and a "small" degree of interference by operating the operation unit 30, the display unit 36 displays the image 50 shown in FIG. 11. The display unit 36 displays each of the 2 ch occupied frequency band and the 7 ch occupied frequency band as the non-recommended frequencies 52. The display unit 36 displays the frequencies other than the non-recommended frequencies 52 as the recommended frequencies 54. In this instance, the bandwidth of the frequency bands displayed as the non-recommended frequencies 52 is 22 MHz, which is the bandwidth of a normal occupied frequency band. As a result, a 2 MHz portion of the recommended frequencies 54 exists between the maximum frequency of the non-recommended frequencies 52 included within the 2 ch occupied frequency band, and the minimum frequency of the non-recommended frequencies 52 included within the 7 ch occupied frequency band.

For example, in the case that the user selects 2 ch and 7 ch and a "medium" degree of interference by operating the operation unit 30, the display unit 36 displays the image 50 shown in FIG. 12. The control unit 32 shifts each of the maximum frequency of the 2 ch occupied frequency band and the minimum frequency of the 2 ch occupied frequency band by 1 MHz toward the center frequency side. Then, the display unit 36 displays the frequency bands after having been subjected to such a shift correction as the non-recommended frequencies 52. The display unit 36 displays the frequencies other than the non-recommended frequencies 52 as the recommended frequencies 54. The display unit 36 performs the same process carried out on the 2 ch occupied frequency band, on the 7 ch occupied frequency band. In this instance, the bandwidth of the frequency bands displayed as the non-recommended frequencies 52 is 20 MHz, which is 2 MHz narrower than the bandwidth of the normal occupied frequency band. As a result, a 4 MHz portion of the recommended frequencies 54 exists between the maximum frequency of the non-recommended frequencies 52 included within the 2 ch occupied frequency band, and the minimum frequency of the non-recommended frequencies 52 included within the 7 ch occupied frequency band.

For example, in the case that the user selects 2 ch and 7 ch and a "large" degree of interference by operating the operation unit 30, the display unit 36 displays the image 50 shown in FIG. 13. The control unit 32 shifts each of the maximum frequency of the 2 ch occupied frequency band and the minimum frequency of the 2 ch occupied frequency band by 2 MHz toward the center frequency side. Then, the display unit 36 displays the frequency bands after having been subjected to such a shift correction as the non-recommended frequencies 52. The display unit 36 displays the frequencies other than the non-recommended frequencies 52 as the recommended frequencies 54. The display unit 36 performs the same process carried out on the 2 ch occupied frequency band, on the 7 ch occupied frequency band. In this instance, the bandwidth of the frequency bands displayed as the non-recommended frequencies 52 is 18 MHz, which is 4 MHz narrower than the bandwidth of the normal occupied frequency band. As a result, a 6 MHz portion of the recommended frequencies 54 exists between the maximum frequency of the non-recommended frequencies 52 included within the 2 ch occupied frequency band, and the minimum frequency of the non-recommended frequencies 52 included within the 7 ch occupied frequency band.

According to the second embodiment, even in the case that there are no free frequencies, the user is capable of being made aware of usable frequencies within a range in which there is an allowable amount of interference.

3. Setting of Frequencies

The user can specify one of the base wireless devices 14 by operating the operation unit 30. The user is capable of setting any arbitrary frequency from among the recommended frequencies 54 displayed on the display unit 36. The control unit 32 transmits the frequency selected by the user to the base wireless device 14 that has been selected by the user. The base wireless device 14 carries out wireless communication using such a frequency.

4. Technical Concepts that can be Obtained from the Embodiments

Hereinafter, technical concepts which are capable of being grasped from the above-described embodiments will be described.

The aspect of the present invention is characterized by the display device 18 which displays, on the display unit 36, the recommended frequencies 54 recommended for use in a wireless device (the base wireless devices 14 and the remote wireless devices 16) that carries out transmission and reception of data by switching between the hopping frequencies in a predetermined frequency band (for example, the frequency band of 2.4 GHz), the display device 18 comprising the storage unit 34 that stores, in association with each other, the plurality of channels or the plurality of center frequencies assigned to the frequency band, and occupied frequency bands that are set to the plurality of channels or the plurality of center frequencies, the operation unit 30 which enables the user to input the channels or the center frequencies, and the control unit 32 that determines, based on the information contained in the storage unit 34, the occupied frequency bands corresponding to the channels or the center frequencies input by the operation unit 30, determines, as the recommended frequencies 54, frequencies included within the frequency band and not included within the determined occupied frequency bands, and causes the display unit 36 to display the recommended frequencies 54.

According to the above-described configuration, frequencies that are not being used are displayed on the display unit 36. Therefore, the user is capable of easily being made aware of the free frequencies existing within a predetermined frequency band, for example, the frequency band of 2.4 GHz.

In the aspect of the present invention, the operation unit 30 enables the user to input a degree of interference indicative of an allowable amount of interference between the radio waves used in the wireless device and other radio waves, and the control unit 32 narrows the bandwidth of the occupied frequency bands as the degree of interference increases, and sets, as the recommended frequencies 54, the frequencies included within the frequency band and not included within the narrowed occupied frequency bands.

According to the above-described configuration, even in the case that there are no free frequencies, the user is capable of being made aware of usable frequencies within a range in which there is an allowable amount of interference.

The display device according to the present invention is not limited to the above-described embodiments, and various additional or alternative configurations may be adopted therein without deviating from the essence and gist of the present invention.

What is claimed is:

1. A display device that displays, on a display screen, recommended frequencies recommended for use in a wireless device configured to carry out transmission and reception of data by switching between hopping frequencies in a predetermined frequency band, the display device comprising:
   a memory; and
   one or more processors that execute computer-executable instructions stored in the memory, wherein
   the memory is configured to store, in association with each other, a plurality of channels or a plurality of center frequencies assigned to the frequency band, and occupied frequency bands that are set to the plurality of channels or the plurality of center frequencies, and
   wherein the one or more processors execute the computer-executable instructions to cause the display device to:
   acquire information regarding the channels or the center frequencies input by a user; and
   determine, based on information stored in the memory, the occupied frequency bands corresponding to the channels input by the user or the center frequencies input by the user, to determine, as the recommended frequencies, frequencies included within the frequency band and not included within the determined occupied frequency bands, and to cause the display screen to display the recommended frequencies.

2. The display device according to claim 1, further comprising:
   a human-machine interface configured to enable the user to input a degree of interference indicative of an allowable amount of interference between radio waves used in the wireless device and other radio waves and,
   wherein the one or more processors cause the display device to:
   acquire, from the information regarding the channels or the center frequencies input by the user, the degree of interference indicative of the allowable amount of interference between the radio waves used in the wireless device and the other radio waves; and
   narrow a bandwidth of the occupied frequency bands as the degree of interference increases, and set, as the recommended frequencies, frequencies included within the frequency band and not included within the narrowed occupied frequency bands.

\* \* \* \* \*